US008140366B2

(12) United States Patent
Adams et al.

(10) Patent No.: US 8,140,366 B2
(45) Date of Patent: Mar. 20, 2012

(54) METHOD, SYSTEM AND PROGRAM PRODUCT FOR FILLING JOB ORDERS

(75) Inventors: Greg Adams, Kennett Square, PA (US);
Nathan Lentz, Downingtown, PA (US);
Ralph Julius, West Chester, PA (US);
Tom Vilbert, Downingtown, PA (US);
Roland Thompson, Malvern, PA (US)

(73) Assignee: Frontline Technologies, Inc., Exton, PA (US)

( * ) Notice: Subject to any disclaimer, the term of this patent is extended or adjusted under 35 U.S.C. 154(b) by 590 days.

(21) Appl. No.: 12/285,371

(22) Filed: Oct. 2, 2008

(65) Prior Publication Data
US 2009/0177518 A1 Jul. 9, 2009

Related U.S. Application Data

(60) Provisional application No. 61/006,274, filed on Jan. 4, 2008.

(51) Int. Cl.
*G06Q 10/00* (2006.01)
(52) U.S. Cl. ............ 705/7.12; 705/7.13; 705/7.14; 705/7.23; 705/7.24; 705/5
(58) Field of Classification Search ........... None
See application file for complete search history.

(56) References Cited

U.S. PATENT DOCUMENTS

| 3,686,482 A | 8/1972 | Gelder |
| 4,845,625 A | 7/1989 | Stannard |
| 4,937,743 A | 6/1990 | Rassman et al. |
| 5,111,391 A | 5/1992 | Fields et al. |

(Continued)

FOREIGN PATENT DOCUMENTS
JP 10-003492 1/1998
(Continued)

OTHER PUBLICATIONS

Aspect Telecomunications Announces Plans to Offer World Wide Web Solutions for Call Centers; New Web Interaction Capabilities for Agility Will Transform Call Centers Into Even More Powerful Customer Information Transaction Centers, Business Wire, Sep. 19, 1995, http://thefreelibrary.com/_/print/PrintArticle.aspx?id=17436173, 3 Sheets.

(Continued)

*Primary Examiner* — Ryan Zeender
*Assistant Examiner* — Denisse Ortiz Roman
(74) *Attorney, Agent, or Firm* — Foley & Lardner LLP

(57) ABSTRACT

A method, system and program product are disclosed for filling job orders, the method comprising: creating electronically a respective commitment reservation for each of a plurality of workers, with each respective commitment reservation comprising a commitment for the respective worker to work on a prospective job not yet created, with the prospective job having one or more job parameters; receiving electronically a job order subsequent to the creation of one of the commitment reservations, the job order specifying a job with one or more job parameters; matching the job parameters of the job in the job order to the job parameters in one or more of the commitment reservations to obtain a reservation-job match; and, securing automatically based on the results of the matching step the job in the job order to one of the workers with a commitment reservation.

26 Claims, 5 Drawing Sheets

U.S. PATENT DOCUMENTS

| | | | |
|---|---|---|---|
| 5,113,430 | A | 5/1992 | Richardson et al. |
| 5,117,353 | A | 5/1992 | Stipanovich et al. |
| 5,164,897 | A | 11/1992 | Clark et al. |
| 5,255,305 | A | 10/1993 | Sattar |
| 5,325,292 | A | 6/1994 | Crockett |
| 5,369,570 | A | 11/1994 | Parad |
| 5,416,694 | A | 5/1995 | Parrish et al. |
| 5,548,506 | A | 8/1996 | Srinivasan |
| 5,592,375 | A | 1/1997 | Salmon et al. |
| 5,634,055 | A | 5/1997 | Barnewall et al. |
| 5,832,497 | A | 11/1998 | Taylor |
| 5,862,223 | A | 1/1999 | Walker et al. |
| 5,884,270 | A | 3/1999 | Walker et al. |
| 5,911,134 | A | 6/1999 | Castonguay et al. |
| 5,913,029 | A | 6/1999 | Shostak |
| 5,913,201 | A | 6/1999 | Kocur |
| 5,918,207 | A | 6/1999 | McGovern et al. |
| 5,940,834 | A | 8/1999 | Pinard et al. |
| 5,974,392 | A | 10/1999 | Endo |
| 5,978,768 | A | 11/1999 | McGovern et al. |
| 6,038,597 | A | 3/2000 | Van Wyngarden |
| 6,044,354 | A | 3/2000 | Asplen, Jr. |
| 6,044,355 | A | 3/2000 | Crockett et al. |
| 6,049,776 | A | 4/2000 | Donnelly et al. |
| 6,058,423 | A | 5/2000 | Factor |
| 6,061,506 | A | 5/2000 | Wollaston et al. |
| 6,061,681 | A | 5/2000 | Collins |
| 6,064,977 | A | 5/2000 | Haverstock et al. |
| 6,192,346 | B1 | 2/2001 | Green |
| 6,253,188 | B1 | 6/2001 | Witek et al. |
| 6,266,659 | B1 | 7/2001 | Nadkarni |
| 6,272,467 | B1 | 8/2001 | Durand et al. |
| 6,272,472 | B1 | 8/2001 | Danneels et al. |
| 6,275,812 | B1 | 8/2001 | Haq et al. |
| 6,289,340 | B1 | 9/2001 | Puram et al. |
| 6,301,574 | B1 | 10/2001 | Thomas et al. |
| 6,311,192 | B1 | 10/2001 | Rosenthal et al. |
| 6,334,133 | B1 | 12/2001 | Thompson et al. |
| 6,370,510 | B1 | 4/2002 | McGovern et al. |
| 6,381,592 | B1 | 4/2002 | Reuning |
| 6,381,640 | B1 | 4/2002 | Beck et al. |
| 6,385,620 | B1 | 5/2002 | Kurzius et al. |
| 6,408,337 | B1 | 6/2002 | Dietz et al. |
| 6,415,259 | B1 | 7/2002 | Wolfinger et al. |
| 6,457,005 | B1 | 9/2002 | Torrey |
| 6,466,914 | B2 | 10/2002 | Mitsuoka et al. |
| 6,470,338 | B1 | 10/2002 | Rizzo et al. |
| 6,524,109 | B1 | 2/2003 | Lacy et al. |
| 6,564,188 | B2 | 5/2003 | Hartman et al. |
| 6,567,784 | B2 | 5/2003 | Bukow |
| 6,587,822 | B2 | 7/2003 | Brown et al. |
| 6,662,194 | B1 | 12/2003 | Joao |
| 6,675,151 | B1 | 1/2004 | Thompson et al. |
| 6,735,570 | B1 | 5/2004 | Lacy et al. |
| 6,873,964 | B1 | 3/2005 | Williams et al. |
| 7,430,519 | B2 | 9/2008 | Thompson et al. |
| 7,945,468 | B1 | 5/2011 | Bernasconi et al. |
| 2001/0042000 | A1 | 11/2001 | Defoor, Jr. |
| 2003/0009437 | A1* | 1/2003 | Seiler et al. ............... 707/1 |
| 2003/0154112 | A1* | 8/2003 | Neiman et al. ............ 705/5 |
| 2003/0204431 | A1* | 10/2003 | Ingman .................... 705/9 |
| 2004/0225550 | A1 | 11/2004 | Helander et al. |
| 2005/0010467 | A1 | 1/2005 | Dietz et al. |
| 2005/0114195 | A1 | 5/2005 | Bernasconi |
| 2009/0099899 | A1 | 4/2009 | Thompson et al. |
| 2009/0177518 | A1 | 7/2009 | Adams et al. |

FOREIGN PATENT DOCUMENTS

| | | |
|---|---|---|
| WO | WO-98/39716 A1 | 9/1998 |
| WO | WO-99/17242 A2 | 4/1999 |

OTHER PUBLICATIONS

Rogers, "What's New," HRMagazine, vol. 43, Issue 5, Apr. 1998, 4 Sheets.

TALX Corporation Releases TALXWare 8.1 Featuring State-of-the-Art Enhancements for Interactive Web and Interactive Voice Response, Business Wire, Aug. 27, 1997, http://www.thefreelibrary.com/_/print/PrintArticle.aspx?id+19701564, 2 Sheets.

Web-On-Call Voice Browser Redefines Access to the Web; Organizations Can Now Extend Their Reach Beyond the Net, Business Wire, Mar. 4, 1996, http://www.thefreelibrary.com/_/print/PrintArticle.aspx?id+18052502, 2 Sheets.

Office Action received in U.S. Appl. No. 09/641,866 on Feb. 1, 2010, 20 pgs.

Office Action received in U.S. Appl. No. 09/641,866 on Aug. 17, 2009, 19 pgs.

Office Action received in U.S. Appl. No. 11/643,769 on Apr. 27, 2010, 20 pgs.

U.S. Appl. No. 13/097,740, filed Apr. 29, 2011, Bernasconi, et al.

U.S. Appl. No. 90/008,803, filed Aug. 9, 2007, Thompson, et al.

The assignee of USP 6,334,133 first sold a service titled "Aesop" for substitute fulfillment on the Web in Jul. 1999 which did not use a seperate web page for and associated only with the respective substitute worker, but did not use timed availability by computer of posistions.

Applying to a Job, Feb. 8, 1998, http://replay.waybackmachine.org/19980208125014/http://www.hotjobs.com/htdocs/answers.html#applyjob.

Eisenberg, Daniel, "We're for Hire, Just Click," Time, vol. 154, Iss. 7, Aug. 16, 1999, 3 pgs.

eWork Launches Online Market Exchange to Meet Growing Demand for Contract Professionals; eWork's Exchange Connects Companies with Growing Force of Contract and Project-Based Pros Who Work Online; Business Editors/High-Tech Writers; Business Wire, New York, Sep. 7, 1999, p. 1.

Goth, Greg et al., "Scarcity of IT Workers is the Mother of Recruiter Innovations," IT Pro, Mar./Apr. 1999, pp. 15-17.

JobAlert—This Space Available, 1997; http://replay.waybackmachine.org/19980113110938/http://www.teachers.net/jobs/jobalert.

National Educators Employment Review, 1996, http://replay.waybackmachine.org/19961223003640/http://www.teacherjobs.com/.

Teachers.net Career Center, 1997, http://replay.waybackmachine.org/19971224041521/http://teachers.net/careers/.

The Hot Jobs Difference, 1998, http://replay.waybackmachine.org/19980208122614/http://www.hotjobs.com/cgi-bin/parse-file?TEMPLATE=/htdocs/difference.html.

US Office Action on U.S. Appl. No. 09/641,866 mailed Jun. 15, 2005; 16 pages.

USPTO Notice of Allowance on U.S. Appl. No. 09/641,866 dated Mar. 14, 2011; 27 pages.

USPTO Office Action on U.S. Appl. No. 09/641,866 dated May 29, 2009; 38 pages.

USPTO Office Action on U.S. Appl. No. 09/641,866 mailed Nov. 18, 2003; 21 pages.

USPTO Office Action on U.S. Appl. No. 09/641,866 mailed Dec. 9, 2002; 14 pages.

USPTO Office Action on U.S. Appl. No. 09/641,866 dated Dec. 17, 2008; 29 pages.

USPTO Office Action on U.S. Appl. No. 12/285,121 dated Aug. 8, 2011; 17 pages.

USPTO office action on U.S. Appl. No. 13/097,740 dated Oct. 3, 2011; 20 pages.

USPTO Office Action on U.S. Appl. No. 09/641,866 mailed Aug. 3, 2010; 44 pages.

"Automated Substitute Finder System," Fall 1994, URL: http://www.csba.oro/ssd/samples/Technology/automated.htm.

"Bellsouth annual meeting takes shareholders back to school and demonstrates education-related technologies," PR Newswire, Apr. 27, 1992 [online printed from Internet on Aug. 22, 2002].

"Myriad locations, student populations no longer hinder substitute management system," The Journal, Nov. 1993.

"'TeacherReacher' A New Feature," NEA Today v11, Nov. 1992 [online printed from Internet on Aug. 22, 2002].

Adecco [online], 1997 [retrieved on Mar. 10, 2002]. Retrieved from Internet: <URL: http://www.Usadecco.com [online printed from Internet on Mar. 10, 2002].

ASA Staffing World—Expo: Exhibitors, 2004.

Baca, Aaron. "Throwing out the sub routine now computers, not secretaries, can find substitutes for absent teachers," The Santa Fe New Mexican, Feb. 20, 1996 [online printed from Internet on Aug. 22, 2002.

Bridgeware Systems—Staffing Industry Software Products, 1997.

Business Ware Services, Inc.—Temp Wizard Solutions, 1981.

Clearview Staffing Software, 2000.

Computer Software Innovations, Inc., Substitute Online Demo—an online tool for managing substitute teachers, Substitute Logon, © 1999, p. 1 of 1. Available at website: http://www.subdemo.com/subdemo/webcode/4 0.html.

CRS, Inc.—Human Resource Automation, Interfacing, CRS—Interfacing Page, pp. 1-2. Available at website: http://www.crs-ivr.com/sub2-interfacing.asp, 2001.

CRS, Inc.—Human Resource Automation, Network Configurations, CRS—Network Configurations Page, pp. 1-3. Available at website: http://www.crs-ivr.com/sub2-networkconfigurations.asp, 2001.

CRS, Inc.—Human Resource Automation, Sub Finder, Make Every Day a Productive Day!, CRS—SubFinder Page, pp. 1-3. Available at website: http://www.crs-ivr.com/subsubfinder.asp 2001.

CRS, Inc.—Human Resource Automation, Technology, CRS—SubFinder Technology Page, Page 1 of 1. Available at website: http://www.crs-ivr.com/sub2-technology.asp, 2001.

Daly, Lesley. "Substitute teacher shortage hits schools," Apr. 24, 1998 [retrieved from the Internet].

eSchool Solutions, SEMS Advantage version 2.8 release announced, Press Release Sep. 21, 2000, pp. 1-2. Available at website: http://www.eschoolsolutions.com/press release/StaffCenter28-5-15-01.htm.

eSchool Solutions, Substitute Employee Management System (SEMS), © 1999, 2000, 2001 eSchool, pp. 1-2. Available at website: http://www.eschoolsolutions.com/sems.htm.

Gellerman, Elizabeth. "Telephone technology increases communication across the board," The Journal v21, n10 p14(4) May 1994.

Givens, Ann. "Schools struggle to find substitute teachers." The Patriot Ledger, Dec. 20, 1997 [online printed from Internet on Mar. 10, 2002].

Haddad, Anne, "Computer Calls for Substitutes," The Sun, Dec. 15, 1994.

Hippel et al. "Temporary employment: Can organizations and employees both win?" The Academy of Management Execution, vol. 11, pp. 93-104, Feb. 1997.

King, Kristen, EBR Schools install system to track substitute teachers, Advocate, Baton Rouge, LA, Apr. 27, 1998.

Laplante, Joseph. "New policy drafted to overcome shortage of substitute teachers," Providence Journal—Bulletin, Apr. 23, 1996 [online printed from Internet on Mar. 10, 2002].

Laplante, Joseph. "Two school departments struggle to fill vacancies. There's no substitute for a substitute . . . " Providence Journal—Bulletin Nov. 25, 1998 [online printed from Internet on Mar. 10, 2002].

Poindexter, Joanne. "Teacher absence plan ok'd policy calls for using substitutes," Roanoke Times and World News, Aug. 9, 1996 [online printed from Internet on Mar. 10, 2002].

Prior art IVR ("interactive voice response") systems and/or services that were known and/or used and/or sold and/or offered for sale by others in one or more employment-related fields, including without limitation, IVR systems and services for use in substitute employee management that were commercially available from the Defendant at least as early as Dec. 21, 1997.

Stepp, Diane, "School Watch: The Daily Hunt for Substitute Teachers," The Atlanta Journal, The Atlanta Constitution, Apr. 9, 1998.

Subs are needed! Fast!; Computer Software Innovations, Inc., May 1999.

Substitute Online, Inc., Logon Page, © 1999, p. 1 of 1. Available at website: http://www.substituteonline.com/subOnline/webcode/main/logon.asp.

Sunoo, Brenda. "Thumbs up for staffing Web sites," Workforce v76 n10 pp: 67-72, Oct. 1997.

T.H.E. Journal L.L.C., Arrange for Substitute Teachers Online, Aug. 1999—Telecommunications, T.H.E. Journal Online: Technological Horizons in Education, Jan. 2002, p. 1 of 1. Available at website: http://www.thejournal.com/magazine/vault!A2120.cfm.

Technology White Paper the Implementation of Distributed Time and Attendance Systems over Corporate Intranets and the Internet/WWW, copyrighted 1997, http://web.archive.org/web/19980201062006/f-tech.com/webtime.htm.

Thomas L. Dean, "Decision Support for Coordinated Multi-Agent Planning, " ACM 1986, pp. 81-91.

Willis, William. "Telephony products enhance convenience, communication & distance learning," The Journal v23 n7 p12(4), Feb. 1996.

Wilson, Carol. "The start of something big," Telephony, Jul. 6, 1992 [online printed from Internet on Aug. 22, 2002].

Work, Deborah, In a class by itself revolutionary computer finds substitute teachers—sometimes more than needed, Apr. 1, 1991, Sun Sentinel, Fort Lauderdale.

* cited by examiner

METHOD, SYSTEM AND PROGRAM PRODUCT FOR FILLING JOB ORDERS

CROSS-REFERENCE TO RELATED PATENT APPLICATIONS

Priority is claimed to application Ser. No. 61/006,274 filed Jan. 4, 2008 and it is incorporated by reference in its entirety. U.S. Pat. No. 6,675,151 is hereby incorporated by reference in its entirety.

SUMMARY OF THE INVENTION

In one embodiment, a method is disclosed for filling job orders, comprising: creating electronically a respective commitment reservation for each of a plurality of respective workers, with each respective commitment reservation comprising a commitment for the respective worker to work on a prospective job not yet created, with the prospective job having one or more job parameters; receiving electronically a job order subsequent to the creation of one of the commitment reservations, the job order specifying a job with one or more job parameters; matching the job parameters of the job in the job order to the job parameters in one or more of the commitment reservations to obtain a reservation-job match; and, securing automatically based on the results of the matching step the job in the job order to one of the workers with a commitment reservation.

In a further embodiment, the one or more predetermined parameters are selected from the group of position type, worksite, work shift, and date range and time range.

In a further embodiment, the operations are disclosed of receiving electronically data indicating that one of the workers did not work on the job secured for that worker; and generating and sending electronically or making accessible electronically a report with the data that the worker did not work on the job secured for that worker.

In a further embodiment, the operations are disclosed of receiving electronically data indicating that one of the workers with a commitment reservation did not work on the job specified secured for that worker; and preventing electronically the creation of a commitment reservation for the one worker.

In a further embodiment, the commitment reservation can be made only by an administrator.

In a further embodiment, the commitment reservation can only be made after receiving an approval electronically from an administrator.

In a further embodiment, the operation is disclosed of preventing electronically a number of commitment reservations for one of the jobs from exceeding a predetermined number.

In a further embodiment, the operation is disclosed of receiving electronically the predetermined number from or on behalf of a client business that is creating the jobs.

In a further embodiment, the operation is disclosed of preventing electronically for one of the workers the creation of a commitment reservation with a date and time range parameter that overlaps with a time-off period for that one worker.

In a further embodiment, the operation is disclosed of creating electronically for one of the workers a commitment reservation with a date and time range parameter only in a period designated as a willing to work period for that one worker.

In a further embodiment, the operation is disclosed of preventing electronically for one of the workers the creation of a commitment reservation with a time range parameter that overlaps a time range parameter for a commitment reservation for a different job previously created for that worker.

In a further embodiment, the operation is disclosed of assigning the job to one from a plurality of the commitment reservations based on a priority and performing the securing based on this assignment.

In a further embodiment, the priority is based on selecting a worker with a commitment reservation having a fewest number of hours worked.

In a further embodiment, the operations are disclosed of creating automatically a customized web page when one of the workers accesses a web site, the web page listing one or more commitment reservations associated with the worker accessing the web site; and facilitating display of available jobs that do not completely overlap a time range for one or more of the commitment reservations of the worker accessing the web site.

In a further embodiment, the operations are disclosed of determining that a number of commitment reservations for a job has exceeded a set number for that job; and taking an electronic action to prevent the making of further commitment reservations.

In a further embodiment, the operations are disclosed of creating electronically a plurality of uncommitted reservations for different prospective jobs with different job parameters for at least one worker, which uncommitted reservation are capable of overlapping in a time range; determining if a job has not been assigned to any commitment reservations; and assigning the job that has not been assigned to a commitment reservation to the worker with the uncommitted reservation.

In a further embodiment, the operations are disclosed of creating electronically an indication of interest of a worker for one or more different prospective jobs, with each different prospective job having one or more different job parameters, wherein the different prospective jobs have not yet been created; receiving electronically a job order, the job order specifying a job with one or more job order parameters; matching the job order parameters for the job in the job order to one or more of indications of interest for a job by a worker to obtain an interest-job match if the job has not been secured to a worker with a commitment reservation; receiving a confirmation communication from the worker associated with the interest-job match; and securing the job to the worker with the interest-job match.

In a further embodiment, a method is disclosed for filling job orders, comprising: creating electronically a plurality of reservations for different prospective jobs with different job parameters for a worker that overlap in a time range, wherein the different prospective jobs have not yet been created; receiving electronically a job order with job parameters for a job subsequent to the creation of the plurality of reservations; matching the job parameters for the job in the job order to one of the reservations to obtain a reservation-job match; securing automatically the worker with the reservation to fill the job based on the results of the matching step; and preventing electronically securing to the one worker one or more different jobs that overlap in the time range with the job that was secured.

In a further embodiment, the operation is disclosed of preventing electronically the creation of a reservation for one of the workers for one of the jobs having a time range parameter that overlaps a time-off period for that one worker.

In a further embodiment, a method is disclosed for creating wait list display, comprising: generating electronically when an electronic criterion is met for a particular worker a first list to be communicated electronically of one or more existing jobs that the particular worker is eligible to work; associating to one of the existing jobs on the first list to be communicated a wait list designator indicating that the particular worker may be placed on a wait list for the associated job that is currently filled by taking a first electronic action; receiving an electronic communication indicating that the first electronic action has been taken by the particular worker; and placing electronically the particular worker on the wait list for the job.

In a further embodiment, the operations are disclosed of appending in adjacency to one of the jobs on the first list a designator indicating that one of the jobs has become open and may be accepted by the particular worker by taking a second electronic action; receiving an electronic communication indicating that the second electronic action has been taken by the particular worker to accept the job; and securing electronically the job for the particular worker.

In a further embodiment, the operations are disclosed of sending an electronic communication to the worker that one of the jobs on the wait list has become open and may be accepted by the particular worker by taking a second electronic action; receiving an electronic communication indicating that the second electronic action has been taken by the particular worker to accept the job; and securing electronically the job for the particular worker.

In a further embodiment, the operation is disclosed of preventing inclusion of a job on the first list to be served if the worker has a previous commitment reservation with a time range parameter that overlaps a time range parameter for the job.

In a further embodiment, the operation is disclosed of preventing inclusion of a job on the first list to be served if the worker has designated a time off period that overlaps a time range parameter for the job.

In a further embodiment, the generating a list step operates to prevent inclusion of a job order on the first list if a number of workers already on the wait list is equal to a predetermined number.

In a further embodiment, the operation is disclosed of providing information to be served associated with the job on first list indicating how many workers are currently on the wait list for the job.

In a further embodiment, the first list is served on a web page customized for the particular worker.

In a further embodiment, there are a plurality of workers on the wait list for a particular job, and further comprising: receiving information that the particular job needs to be filled; selecting one of the workers on the wait list for the particular job based on at least one criterion; notifying the worker that the worker was selected for the particular job; and securing electronically the particular job for the worker.

In a further embodiment, the operations are disclosed of receiving information that the electronic action has been taken to place one of the workers on the wait list for a plurality of different jobs, but with at least one of the jobs being designated electronically as preferred; and generating electronically and serving when the one worker next connects to his/her web page a list of one or more existing jobs that the particular worker is eligible to work, with the job designated as preferred differentiated in the list.

In a further embodiment, a method is disclosed comprising maintaining electronically a listing of an existing assignment of a job for a current worker; receiving electronically a time-off entry or an absence entry for the current worker that overlaps for a period of time the existing assignment; creating automatically a vacancy to cover at least the overlap of the period of time for the existing assignment and the time-off entry; receiving electronically a preference for a specific worker to fill the vacancy; communicating only with the specific worker about the vacancy but only if the vacancy has not been filled with a reservation commitment; posting the vacancy to one or more other workers only if no acceptance of the vacancy has been received from the specific worker within a predetermined period of time and only if the vacancy has not been filled with a reservation commitment.

In a further embodiment, the preference is received from the current worker.

In a further embodiment, a method is disclosed of filling job orders, comprising: receiving electronically a job order specifying a job with a plurality of job parameters including a first pay rate; filtering electronically to obtain a set of one or more qualified workers that meet the parameters of the job; communicating electronically the job only to each of the one or more qualified workers; receiving electronically from the one or more of the respective qualified workers one or more respective bids for the job, each with a respective lowest minimum pay rate to perform the job; communicating electronically to the respective qualified workers one or more of the respective lowest minimum pay rates received; facilitating an electronic capability for each of the one or more of the respective qualified workers to submit a minimum pay rate in competition with the one or more respective lowest minimum pay rates that are bid; and securing automatically, at a time after the communication electronically of the one or more respective lowest minimum pay rates, the job to one of the qualified workers based at least in part on the one or more respective lowest minimum pay rates currently communicated at the time of performing the securing.

In a further embodiment, a respective lowest minimum pay rate is received from a plurality of the qualified workers, and wherein the communicating electronically step comprises communicating electronically a plurality of the respective minimum pay rates each coupled with a characteristic, and wherein the securing comprises securing the job to one of the qualified workers based also on the respective characteristic.

In a further embodiment, the different characteristic comprises a skill level of the qualified worker.

In a further embodiment, the communicating electronically the job comprises posting the job on each of a plurality of respective web pages customized for the respective qualified workers, wherein the communicating electronically the one or more lowest minimum pay rates comprises posting the one or more lowest minimum pay rates on the plurality of respective web pages customized for the respective qualified workers, and wherein the communicating electronically the capability comprises serving on the respective web pages for the respective qualified workers the capability to submit a minimum pay rate in competition with the one or more lowest minimum pay rates.

In a further embodiment, after receiving bids from enough workers to fill all of the jobs in the job order, the operation is performed of serving or otherwise electronically communicating to one or more of the qualified workers subsequently accessing their respective web pages or electronic appliances a second pay rate for performing the job that is less than the first pay rate.

In a further embodiment, only the communicating electronically the job to the qualified workers having a reservation commitment recorded electronically for the job.

In a further embodiment, the operations are disclosed of calculating electronically a difference between the maximum pay rate for the job and the lowest minimum pay rate at which the job was secured; and apportioning electronically this difference between an entity that secures the job and a job provider or contractor.

In a further embodiment, the operations are disclosed of communicating electronically the minimum pay rate received from another qualified worker that is lower that the lowest minimum pay rate that is communicated and designating that minimum pay rate as the lowest minimum pay rate; providing electronically a capability for one or more of the qualified workers to submit a minimum pay rate that is lower that the lowest minimum pay rate currently communicated; and securing automatically the job to one of the qualified workers that has sent the lowest minimum pay rate in the system at the time of performing the securing.

In a further embodiment, a system for filling job orders is disclosed, comprising: one or more computers programmed among them if more than one to perform the operations: creating electronically a respective commitment reservation for each of a plurality of respective workers, with each respective commitment reservation comprising a commitment for the respective worker to work on a prospective job not yet created, with the prospective job having one or more job parameters; receiving electronically a job order subsequent to the creation of one of the commitment reservations, the job order specifying a job with one or more job parameters; matching the job parameters of the job in the job order to the job parameters in one or more of the commitment reservations to obtain a reservation-job match; securing automatically based on the results of the matching step the job in the job order to one of the workers with a commitment reservation.

In a further embodiment, a program product is disclosed for filling job orders, comprising: one or more computer readable media, comprising there among if more than one, program code for causing a computer, when executed, to perform the following steps: creating electronically a respective commitment reservation for each of a plurality of respective workers, with each respective commitment reservation comprising a commitment for the respective worker to work on a prospective job not yet created, with the prospective job having one or more job parameters; receiving electronically a job order subsequent to the creation of one of the commitment reservations, the job order specifying a job with one or more job parameters; matching the job parameters of the job in the job order to the job parameters in one or more of the commitment reservations to obtain a reservation-job match; securing automatically based on the results of the matching step the job in the job order to one of the workers with a commitment reservation.

In a further embodiment, a system for filling job orders is disclosed, comprising: one or more computers programmed among them if more than one to perform the operations: creating electronically a plurality of reservations for different prospective jobs with different job parameters for at least one worker that overlap in a time range, wherein the different prospective jobs have not yet been created; receiving electronically a job order with job parameters for a job subsequent to the creation of the plurality of reservations; matching the job parameters for the job in the job order to one of the reservations to obtain a reservation-job match; securing automatically the worker with the reservation to fill the job based on the results of the matching step; and preventing electronically securing to the one worker one or more different jobs that overlap in the time range with the job that was secured.

In a further embodiment, a system for creating wait list display is disclosed, comprising: one or more computers programmed among them if more than one to perform the operations: generating electronically when an electronic criterion is met for a particular worker a first list to be communicated electronically of one or more existing jobs that the particular worker is eligible to work; associating to one of the existing jobs on the first list to be communicated a wait list designator indicating that the particular worker may be placed on a wait list for the associated job that is currently filled by taking a first electronic action; receiving an electronic communication indicating that the first electronic action has been taken by the particular worker; and placing electronically the particular worker on the wait list for the job.

In a further embodiment, a system for filling job orders is disclosed, comprising: one or more computers programmed among them if more than one to perform the operations: receiving electronically a job order specifying a job with a plurality of job parameters including a first pay rate; filtering electronically to obtain a set of one or more qualified workers that meet the parameters of the job; communicating electronically the job only to each of the one or more qualified workers; receiving electronically from the one or more of the respective qualified workers one or more respective bids for the job, each with a respective lowest minimum pay rate to perform the job; communicating electronically to the respective qualified workers one or more of the respective lowest minimum pay rates received; facilitating an electronic capability for each of the one or more of the respective qualified workers to submit a minimum pay rate in competition with the one or more respective lowest minimum pay rates that are bid; and securing automatically, at a time after the communication electronically of the one or more respective lowest minimum pay rates, the job to one of the qualified workers based at least in part on the one or more respective lowest minimum pay rates currently communicated at the time of performing the securing.

DETAILED DESCRIPTION OF THE PREFERRED EMBODIMENTS

Figure 1:
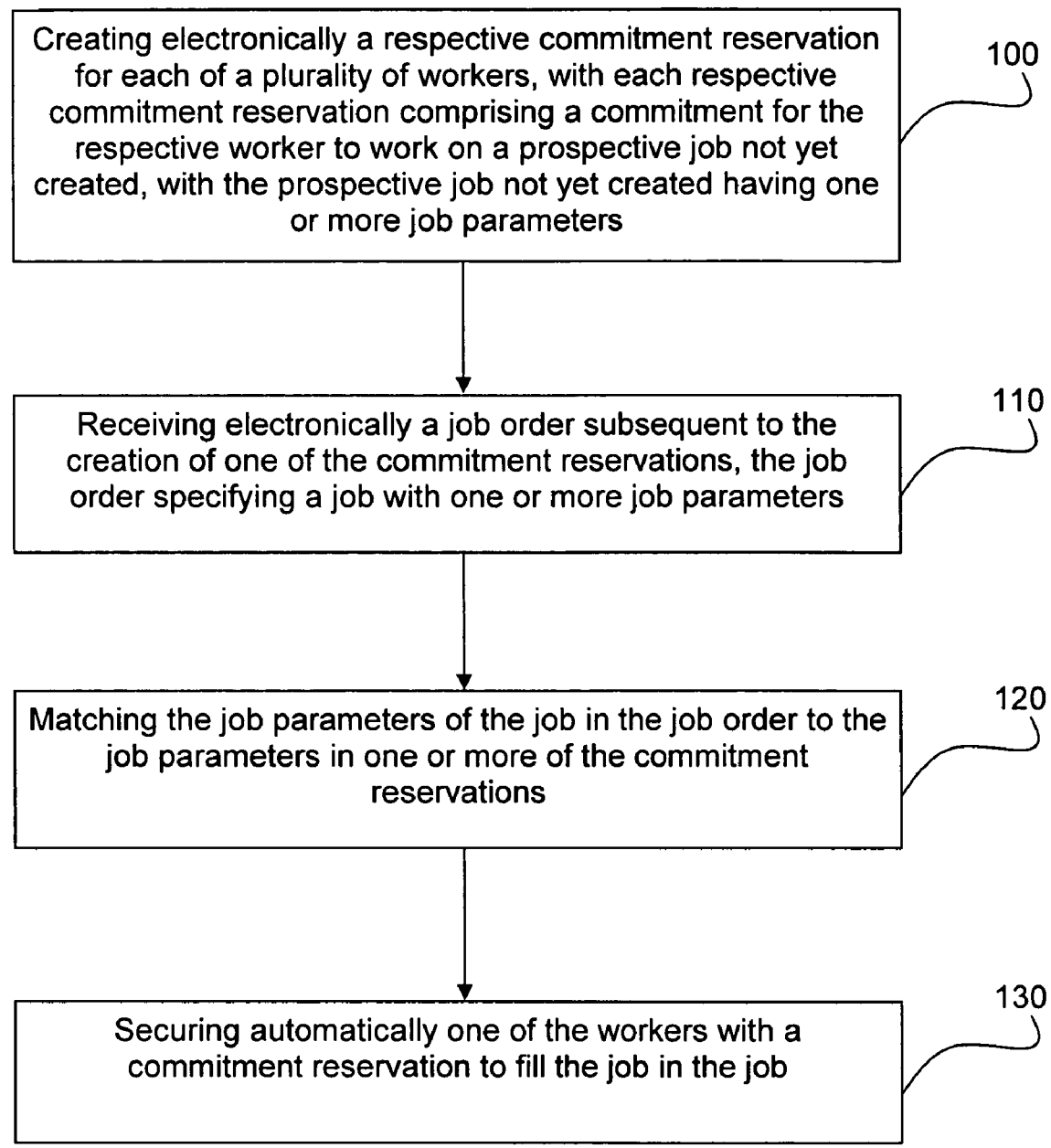
FIG. 1 is a block diagram of a flowchart for one embodiment of a method in accordance with the invention.

The present invention is related to providing job placement and fulfillment. The invention is particularly useful in placing employees and/or temporary workers or contractor workers in a flexible work environment. The system is designed to fill jobs that may open or be created in the future. Although not limited thereto, it is especially advantageous for use in conveying job information to customized worker web pages or worker electronic communication appliances (cell phones, PDA's, etc.), or other electronic communication devices, where a filtering of the job parameters against worker qualifications, and/or work site, and/or date and time range of availability is performed.

In one embodiment, the system creates a "reservation" for a worker to work a job with one or more specified parameters, such as Position Type(s), Worksite(s), Work shift(s), date range with selected days of the week, and/or other parameters. The "reservation" comprises a commitment of the worker to work the reserved job when it is subsequently created or opened.

In one embodiment, no work orders are created as a consequence of creating a reservation. Instead, commitment reservations are matched and honored when a job is created or changed/becomes open (including if a currently assigned worker or worker is removed from a job or is absent or schedules a time-off period). The "reservation" concept, in one embodiment, is based on the assumption that, over time, enough orders will be created in the system that match the characteristics specified in the reservations to satisfy the predefined reservations.

The system is implemented by a fulfillment engine 20 that receives and makes various communications over one or more networks to make reservations for workers 90, 92, 93, and 95 and then matches those reservations to jobs created or opened subsequently by various job providers 80A-80C. See FIG. 5, which will be described in more detail below.

In one embodiment, different types of reservations can be created by the fulfillment engine 20, and the system treats these reservation types differently. Example reservation types are listed below:

| | |
|---|---|
| Reservation Type | Type 1 = Commitment Reservation |
| Created By | Placed into the system by an Administrator, after receipt of a proposed reservation with specified job parameters (time/shift, date, job type, location, etc.) by a worker, or in some embodiments placed into the system by the worker. |
| How Jobs Assigned | The System Automatically Assigns jobs or a manual override feature can be used. |
| Description | The system will automatically assign the workers to jobs with the parameters they specify in their respective reservations as the jobs are created or become available. The system may include some form of regulator controlling the number of jobs that may be reserved to prevent an excess of commitment reservations that exceeds a limited number of jobs, i.e., over committing. For example, the system may contained programmed limits for specific jobs for specific shifts or time periods or times of the year or based on orders received, e.g., no more than 10 commitment reservations for the $2^{nd}$ shift in the Summer. Alternatively, the system administrator may use such parameters to control the number of commitment reservations for specific jobs or job types.<br>The fulfillment engine may be programmed to assign commitment reservations using a wide variety of priority algorithms, e.g., first come first serve, random, workers with fewest hours worked assigned first, workers with more seniority assigned first, fewest workers working overtime, to name a few.<br>In one embodiment, a customized worker web page accessed by the worker via an ID and PASSWORD will list all job assignments for that worker as well as such committed reservations for that worker for one or more jobs to be created in the future. In one embodiment, the commitment reservation may be displayed in a same "visual manner" as existing job assignments. In this respect, the worker can consider a "committed reservation" to be the same as an assignment to a "locked-in job order." The web page may further include a listing of all available jobs, or all available jobs filtered so that only jobs for which the worker is qualified are displayed. Alternatively, such available jobs may be accessible on the display via an electronic link.<br>Notification of job creation: In some embodiments, because the reservation is considered a commitment and is expected to be honored by the worker, no notification message is sent to the worker when the actual assignment is created. Alternatively, in some embodiments, a notification is only sent if no job is created that meets the reservation. In other embodiments, a notice is sent when a job is created and that job is secured to the worker making the commitment.<br>Because this type of reservation is a commitment, the system may be programmed in one embodiment to prevent the creation of a commitment reservation that overlaps an already existing time-off period scheduled for the worker. When creating a new time-off period, in one embodiment, the time-off creation process effectively cancels any existing commitment reservation that overlaps the time-off period, or cancels the commitment reservation at least for the overlapof that time-off period.<br>Additionally, the system may be programmed to create electronically for one of the workers a commitment reservation with a date and time range parameter only in a period designated as a willing to work period for that one worker.<br>When creating a commitment reservation for a worker, in one embodiment the system is programmed to prevent the administrator from creating commitments that overlap other existing commitment reservations for that worker. However, the administrator will be permitted to create conflicting auto-assign or manual-assign reservations - they are just not shown to the worker as "commitments." See the appropriate description of these reservation types below.<br>When shopping/searching for a job via the system, an existing commitment reservation will prevent the worker from seeing available jobs that overlap any commitment reservation they have made. In one embodiment, a search algorithm 23 will automatically search for all jobs that the worker is qualified | to fill at the time of the worker's log-in to the system. The worker's web page will be populated with such jobs. Alternatively, a worker web page may simply be updated each time a job is created or opened. Alternatively or in addition, the worker may initiate a search of jobs by specifying various job parameters.

| | |
|---|---|
| Reservation Type | Type 2 = Uncommitted, Automatic |
| Created By | Placed into the system by an Administrator, after receipt of a proposed reservation with specified job parameters (time, date, job type, location, etc.) by a worker, or in some embodiments placed into the system by the worker. |
| How Assigned | Automatically Assigned by the System or via manual override. |
| Description | The system is programmed to automatically assign these workers to jobs only after all "committed" reservations have been honored/fulfilled. The administrator can program the sequence in which uncommitted reservations are honored: Random, First Come First Serve, workers with fewest hours worked, workers with most seniority assigned - first, assign to obtain fewest workers working overtime, etc.<br>On the Worker web page, uncommitted reservations will appear in a visual manner which clearly indicates a waiting status. In some embodiments, the worker's position in a wait list for the job assignment may be indicated in the display of the web page. However, if the programmed assignment sequence is Random, the worker will be shown the number of workers on the wait list, instead of the actual position on the wait list.<br>The system is programmed to send or post an appropriate notification message to the worker and administrator(s) when the assignment is created. Because these reservations are uncommitted, the administrator can create overlapping reservations for the worker for different jobs, e.g., Reservation 1: 6 am-12 noon Monday-Friday - clerk position, and Reservation 2: 9 am-3 pm Monday-Friday - electrician. The first uncommitted reservation assigned to a job effectively cancels all such other overlapping uncommitted reservations for that worker. In one embodiment, the fulfillment engine 20 is programmed to cause the worker's web page to show jobs that overlap the uncommitted reservations. However, the Fulfillment engine 20 may be programmed to prevent the worker from seeing reservations that are in conflict with existing job assignments or time-off requests.<br>In one embodiment, the system can be programmed to assign electronically for one of the workers a job with a date and time range parameter only in a period designated as a willing to work period for that one worker.<br>In a further embodiment, the system can be programmed to award jobs based on one or more preferences for certain workers, or certain skill levels or for other parameters. |

| | |
|---|---|
| Reservation Type | Type 3 = Uncommitted, Manual Reservation |
| Created By | Placed into the system by an Administrator, after receipt of a proposed reservation with specified job parameters (time, date, job type, location, etc.) by a worker, or in some embodiments placed into the system by the worker. |
| How Assigned | Manually Assigned by the Administrator. In some embodiment, a manual assignment by the Administrator could be set up to require confirmation by the Worker. |
| Description | The system will not automatically assign manual reservations to jobs. Instead, the Administrator can choose which workers with this type of reservation are assigned to jobs when a job is created.<br>The fulfillment engine may be programmed to provide a visual indication on the worker's web page that the worker is on this kind of wait list, or alternatively, may be programmed to exclude such a visual indication since neither the system nor the administrator has an obligation to honor these manual reservations. The fulfillment engine will generate and send an appropriate notification message to the worker and administrator(s) if a job is created or opened and the administrator assigns the worker the job.<br>In one embodiment the fulfillment engine is programmed to allow the administrator to see manual reservations for a worker that are in conflict with a worker's existing assignments or time-off requests, but it will prevent the administrator from creating a conflicting assignment.<br>In a further embodiment, the system is programmed to assign electronically for one of the workers a job with a date and time range parameter only in a period designated as a willing to work period for that one worker.<br>The administrator must understand that Workers can actively shop for jobs online or by telephone for jobs that match the ones specified in this manual |

-continued reservation. Thus, it is possible that the workers will fill all jobs before the administrator has had a chance to manually honor these reservations.

| | |
|---|---|
| Reservation Type | Type 4 = Worker Waitlist |
| Created By | By worker. In some embodiment it could also be placed into the system by an Administrator, after receipt of a proposed reservation with specified job parameters (time, date, job type, location, etc.) by a worker. |
| How Assigned | In some embodiments, requires Confirmation by Worker. |
| Description | This reservation is created by a worker (who has been given the appropriate permission in the system to create a waitlist reservation) when no jobs of the specified parameters currently exist or are all filled. In one embodiment, the administrator can indicate the maximum number of workers that can be added to the waitlist for a specific job, worksite, and work shift combination. A worker is able to put himself/herself on a waitlist for a particular job. In one embodiment, this reservation type is selectable in a Reservation Search page. In one embodiment, a worker on a waitlist for a given job will not be automatically assigned by the system when a job is created or otherwise becomes available. Instead, the Worker(s) waiting for a specific job will be contacted via their preferred contact mechanism (IVR, Email, etc) in "wait list" order (which might be random, or first come first serve, or seniority based, etc,). The system will make a job assignment to a worker on the waitlist after receiving acceptance from the worker.<br>In order for a waitlist reservation to be created, all jobs with the specified combination of factors must already be filled for a specific day or range of days. Accordingly, the fulfillment engine 20 is programmed to create a customized worker web page so that, when the worker searches for a job, if a job with the specified parameters is not filled, i.e., is currently available, the worker's web page will display an "Accept" link. When all jobs with this parameter set are filled, the worker's web page will display an "Add to Wait List" link. Selecting the Add to Wait List hyperlink creates a 'waitlist' reservation for a job with the specified parameters, e.g., worksite, position type, workshiftID, etc., for that worker.<br>The fulfillment engine may be programmed in one embodiment to only show filled jobs available for waitlisting if a number or depth of workers waitlisted for the particular job is less than some maximum number, e.g., only a maximum of 3 waitlist requests would be allowed. In this case, if there were already 3 waitlist requests for a particular job, then the worker would not see the job on his/her web page. Alternatively, a depth of the waitlist and the worker's position in that depth could be displayed with the filled job that is waitlisted. Thus, if the WaitList count is 5 for a particular filled job, the worker might elect not to add his/her name to the waitlist.<br>In some embodiments, control over whether or not jobs can be wait listed may be added to the programming. For example, waitlisting limitations may be imposed<br>By the job provider (overall ON/OFF) for this functionality;<br>Based on the job type (i.e., particular job types may not be waitlisted;)<br>Based on the position type (i.e. particular position types may not be waitlisted);<br>Based on the job order (i.e. particular positions of a job order may be specified as not subject to waitlisting);<br>Specific workers excluded (i.e. a specific worker may not be allowed to request waitlisting).<br>The fulfillment engine may be programmed to fill reservations in the following priority order:<br>1. Commitment reservation;<br>2. Auto Assignments;<br>3. Wait Lists.<br>This priority assignment means that if a worker created a 'wait list' reservation, but prior to a job matching the waitlist entry becoming available, someone else created a commitment reservation or auto assignment, the worker would not get assigned the job.<br>On the Worker web page, the fulfillment engine is programmed to show jobs for which the worker is waitlisted in a visual manner which clearly indicates the waiting status, and in some embodiments, the current depth in the wait list. If the assignment sequence is Random, the worker will be shown the maximum number of workers that can appear on the wait list, instead of this worker's actual position on the wait list. |

| | |
|---|---|
| Reservation Type | Type 5 = WaitlistWorker Job Preference |
| Created By | Worker |
| How Assigned | Manually Assigned by the Worker |
| Description | The Worker WaitList concept above is extended to allow the worker to specify specific job preferences.<br>Jobs with specified parameters that match these one or more preferences are shown to the worker "separately" or with a special marking from jobs that do not match these preferences, e.g., Here are the jobs you specifically "prefer" vs. here are all the rest of the jobs. |

| | |
|---|---|
| Reservation Type | Type 6 = Worker Requested Replacement |
| Created By | Worker |
| How Assigned | Manually Assigned by the Requesting Worker. |
| Description | When the worker creates a Time-Off entry or an absence entry is created that overlaps an existing assignment for a worker, the fulfillment engine is programmed to create a new vacancy to cover the worker's time-off or absence period. In one embodiment, the time-off or absent worker can specify that one or more other specific workers be given preference to fill that vacancy. The worker web page for the respective preferred workers will display the new vacancy and indicate that the worker has been given a preference that will expire is a given period of time.<br>The fulfillment engine is programmed to allow the administrator to define the particular amount of time after the vacancy is created that the system will give the preferred workers to review and accept the vacancy. If none of the preferred workers accepts the vacancy within the predefined amount of time, the vacancy will become available for shopping to the general worker population that meet the job qualifications. |

| | |
|---|---|
| Reservation Type | Type 7 = Worker Job Bidding |
| Created By | Worker |
| How Assigned | Automatically Assigned at the close of the bidding process. |
| Description | Some job providers may want to implement a shift or job bidding concept in order to fill jobs. In one embodiment, the fulfillment engine is programmed so that on a Job Type object for that job, a "Searchable" Boolean flag is changed to an enumeration that allows 3 values: Not Searchable, Searchable, and Biddable. Jobs that are Biddable require 2 additional fields: 1) a field to specify how far before the start of the job that bidding closes, e.g. 24 hours before the start of the job (to provide adequate time to notify the winning workers, and 2) a field for the minimum bidding increment, e.g. 25 cents per hour.<br>Workers must be qualified and available (no scheduled time-off period overlap the job period and/or the worker list the period as an available to work period) for a given job in order to bid on it. When a bid is placed, the worker must specify the minimum pay rate he or she is willing to accept in order to work the specified job. Initially, unfilled biddable jobs will be shown to the worker at the pay rate found on the job provider rate card - this becomes the maximum rate that the job provider might have to pay the worker for this job. After bids have been received to cover all jobs of a given type, the next worker to access the job is shown the "pay rate to beat," e.g., the lowest pay rate bid by a competing worker, or is shown a new current rate for the job, e.g., the old current rate reduced by one or more increments. When submitting a bid, the worker must specify in the bid a minimum acceptable pay rate to work this job or accept the new current rate.<br>A Rate Card Object may be programmed to allow a contractor or job provider to specify a minimum worker pay rate, in addition to a starting worker pay rate. For example, the job provider might have 4 open positions, and the contractor providing workers or job provider is willing to pay the worker at a minimum of $8 per hour and a maximum of $10 per hour for this kind of job (according to the rate card). The first 4 bidders would see "Current pay rate is $10 per hour" and may be asked to specify their minimum pay rate or to accept the current pay rate. If no other worker places a bid by the time bidding closes, then the system will automatically assign these 4 bidders to the jobs, and the job provider pays the worker the initial pay rate of $10 per hour. |

However, if at least 1 other worker accesses the biddable job, then the fulfillment engine would lower the current pay rate by one or more increments and that worker would see "Current pay rate is $9.75 per hour" specified for the job. The additional worker would need to specify a minimum acceptable pay rate in making a bid for the job. As a result of the bidding process, the job provider would pay something less than the initial $10 per hour for at least one of these jobs (depending on how many more workers bid on the jobs).

The fulfillment engine could be programmed to split the overall savings between the system and the job provider in some acceptable manner. This additional savings/revenue encourages the use of the bidding process.

In a further embodiment, the fulfillment engine may be programmed to take into account one or more other characteristics in assigning jobs. In such an embodiment, the operations would be provided of receiving electronically a job order specifying a job with a plurality of job parameters including a first pay rate; posting the job on each of a plurality of selected individual worker web pages for respective selected individual workers; receiving electronically from one or more of the selected individual workers respective bids for the job with a respective lowest minimum pay rate to perform the job; posting on each of a plurality of selected individual worker web pages one or more of the respective minimum pay rates, serving on the respective web page for each of the one or more of the selected individual workers a capability to submit a minimum pay rate in competition with one or more of the lowest minimum pay rates that are posted on the individual worker web pages; and securing automatically, at a time after the posting of the one or more of the lowest minimum pay rates, the job to one of the selected individual workers based at least in part on the one or more respective lowest minimum pay rates currently posted at the time of performing the securing. In one embodiment, the respective minimum pay rate is coupled with a different characteristic. This different characteristic may be displayed on the selected individual worker web pages or may be only displayed to the administrator. In this embodiment, the worker may be selected for the job in the securing operation based in part on the minimum pay rate, and in part on the respective different characteristics.

In one embodiment, the different characteristic may comprise a skill level of the selected individual worker.

---

In one embodiment, in order to implement the reservation system, the following functionality and report generation (web page and/or written) capability may be provided:

1) Functionality to Manage Reservations:
   a. A menu item to Create new reservations for one or more workers.
   b. A menu item to Change existing reservations for a worker.
   c. A menu item to Review current reservations and their status.
   d. A menu item to Manually fulfill reservations for a job or a worker.
2) Display Dashboard: Unsatisfied Commitments
   e. A display dashboard is provided with a graph that shows Unsatisfied Commitments over a period of time, e.g., a 7 day period.
   f. This graph would also provide "drill-down" capability to determine more details about the unsatisfied commitments for further analysis.
3) Report generation functionality: A report would be generated showing current system job commitments for "this kind of job" over a given time range.
4) Report generation functionality: A report would be generated showing Which jobs are over-committed?
   g. This includes the ability to notify electronically those workers whose commitment reservations cannot be honored.
   h. This functionality simplifies a potential problem—where on rare occasions the required headcount for a particular kind of job on a given shift dips below the number of committed reservations for that particular shift.
5) Report Generation Functionality: Who is on the wait list for "this kind of job"?
   a. This web page report includes a link to assign the waitlist worker(s) to unfilled, matching jobs.
6) Qualified and Available Workers Report Generation Functionality:
   a. This web page provides a visual indication of which workers are waiting, and their position in the waitlist.
7) Worker Assignment List
   a. The system displays the details of a committed reservation to the worker.
8) A Job Assignment Object in the system provides a reference to the commitment reservation that was matched to a newly created or opened job that resulted in a job assignment. If not specified, then the job assignment was not made as result of a commitment reservation. This field provides:
   a. Fast linkage to support a dashboard graph,
   b. Administrator visibility into how job assignments are created. This information can be used in the circumstance where the administrator needs to remove someone from a job in order to honor a manually assigned reservation.

The display provided by the fulfillment engine, in one embodiment, may have the following characteristics:

1. Each reservation (site/shift/pt/days of the week mask) is a single entity. Reservations need not be grouped together.

2. The Reservation grid screen will be used for CREATE only. A grid format is provided as a convenience for creating multiple reservations from a single screen. In one embodiment, the grid would have the following characteristics:
   a. The grid will support a single Customer only.
   b. The grid will support multiple sites (locations).
   c. The grid will support multiple shifts
   d. The grid will support multiple position types.
   e. The grid will support multiple report to names.

f. The grid will validate that new committed reservations do NOT overlap existing committed reservations.

3. A Human Relations web page may linked to and modified to include a new 'Reservation List' in a 'Transaction' section.
   a. For example, a 'more' link will navigate the user to a 'Reservation Search Page'.

4. A new 'Reservation Search Page' may be created as follows:
   a. It will have filters for
      i. WorkerID
      ii. WorkSite
      iii. WorkShift
      iv. Position Type
      v. Days of the week Mask
      vi. From Date/To Date
   b. The user will be able to hyperlink to a 'Reservation Edit' page.

5. A 'Reservation Edit' page will
   i. show a single reservation
   ii. allow edit on From Date (only if From Date is in the future)
   iii. allow edit on To Date
   iv. allow edit on the Days of the week Mask
   v. allow DELETE of the entire reservation
   c. If a user needs to change the site, shift or position type, then they must create a new reservation.

An administrator display may be generated by the fulfillment engine and may include a variety of web reports including:

1. A daily reservation activity report that can filter by date, location, shift, job type, etc.

2. A weekly reservation report that can filter by week, location, shift, job type, etc., and provide a listing by day and time of filled reservations, unfilled reservations, total, fill rate and other pertinent parameters.

3. A worker roster and a vacancy report may be displayed by date, job type, location and shift, etc.

4. Unfilled reservation commitments may be displayed by date, job type, location and shift, etc.

5. A "Create a Reservation" web page is provided that in one embodiment, allows: a worker to be selected, a job provider to be selected with Start and End dates, a position type to be selected, a shift to be selected, a days of the week pattern selected, other pertinent parameters selected, and a Create button available for clicking to create the reservation.

6. A Conflicts Calendar may be provided that shows schedule conflicts due to another commitment reservation, time off scheduled, designated willing to work periods, etc, displayed using different colors or using some other attention-grabbing scheme.

7. A Managing an Employee screen may be provided that shows a calendar grid with the days color coded to show reservations, assigned shifts, time off days, partial time off, designated willing to work periods, and other listings as desired.

8. A Reservation Edit screen may be provided to allow editing all of the reservation parameters.

9. A Reservation Search page may be provided that allows reservations to be searched using various filters including reservation type, status, branch, location, shift, position type, date range, etc.

10. A Cancel or Delete Reservation page may be provided.

11. An Inactivate Worker page may be provided to inactivate a worker in the system and to facilitate moving or making available to other workers upcoming jobs that had previously been assigned to the worker and inactivating reservations made by or for the inactivated worker.

Various method and system programming will now be discussed. Referring to the drawings, FIG. 1 discloses a flowchart of one embodiment of a method and programmed system for filling job orders. Block 100 comprises an operation of creating electronically a respective commitment reservation for each of a plurality of respective workers, with each respective commitment reservation comprising a commitment for the respective worker to work on a prospective job not yet created, with the prospective job having one or more job parameters. For example, the one or more job parameters may be selected from the group of position type, worksite, work shift, and date range and time range. Note that a worker in some embodiments, will not even be aware of the job unless her or she is qualified, due to electronic filtering operations that will own communicate to the worker jobs for which the worker meets the job parameters of skill level, and/or work site, and/or date and time requirements, or worker willing to work period, to name a few. Such a filtering operation may be performed by the administrator or by the system automatically.

Block 110 comprises an operation of receiving electronically in an email, electronic file, posting or other electronic communication a job order subsequent to the creation of one of the commitment reservations, with the job order specifying a job with one or more job parameters.

Block 120 comprises an operation of matching the job parameters of the job in the job order to the job parameters in one or more of the commitment reservations to obtain a reservation-job match.

Block 130 comprises an operation of securing automatically based on the results of the matching step the job in the job order to one of the workers with a commitment reservation. In one embodiment, the securing operation comprises associating the worker with the job, e.g., 4 pm-12 am shift, Sep. 2-5, 2008, Electrician position 1, Shipley site. The securing operation may further comprise the operation of removing the job from one or more lists of available jobs created or updated for other workers and designating the job as filled.

In a further embodiment, an operation may be included of receiving electronically data indicating that one of the workers did not work on the job secured for that worker, and an operation of generating and sending electronically or making accessible electronically a report with the data that the worker did not work on the job secured for that worker.

In a further embodiment, an operation may be included of receiving electronically data indicating that one of the workers with a commitment reservation did not work on the job secured for that worker, and an operation of preventing electronically the creation of a commitment reservation for the one worker.

In one embodiment, the commitment reservation can be made only by an administrator. In another embodiment, the commitment reservation can only be made after receiving an approval electronically from an administrator.

In a further embodiment, an operation may be included of preventing electronically a number of commitment reservations for one of the jobs from exceeding a predetermined number. By way of example, the predetermined number of commitment reservations may be received electronically from or on behalf of a client business that is creating the jobs.

In a further embodiment, an operation may be included of preventing electronically for one of the workers the creation of a commitment reservation with a time range parameter that overlaps with a time-off period for that one worker.

In a further embodiment, an operation may be included of preventing electronically for one of the workers the creation of a commitment reservation with a time range parameter that overlaps a time range parameter for a commitment reservation for a different job previously created for that worker.

In a further embodiment, the operation is disclosed of creating electronically for one of the workers a commitment reservation with a date and time range parameter only in a period designated as a willing to work period for that one worker.

In a further embodiment, an operation may be included of assigning the job to one from a plurality of the commitment reservations based on a priority and performing the securing operation based on this assignment. By way of example, the priority may be based on selecting a worker with a commitment reservation having a fewest number of hours worked, or by seniority level, or to minimize the payment of overtime, to name a few.

In a further embodiment, an operation may be included of creating automatically a customized web page when one of the workers accesses a web site. The customized web page might comprises a listing one or more commitment reservations currently associated with the worker accessing the web site, a list of available jobs that the worker is qualified to fill, and any scheduled time-off. In one embodiment, the available jobs which overlap in time with commitment reservations and/or scheduled time-off may be filtered out of the list.

In a further embodiment, an operation may be included of determining that a number of commitment reservations for a job has exceeded a first number of orders for that job in one or more past periods, and taking an electronic action, such as preventing the creation of any further commitment reservation for this job or job type, if a current number of commitment reservations exceeds the first number of orders for that job in a current period.

In a further embodiment, an operation may be included of determining that a number of commitment reservations for a job has exceeded a set number for that job, and taking an electronic action to prevent the making of further commitment reservations for that job.

In a further embodiment, operations may be included of creating electronically a plurality of uncommitted reservations for different prospective jobs with different job parameters for at least one worker, which uncommitted reservations are capable of overlapping in a time range, determining if a job has not been assigned to a commitment reservation, and assigning the job that has not been assigned to a commitment reservation to the worker with the uncommitted reservation.

In a further embodiment, operations may be included of creating electronically an indication of interest by a worker for one or more different prospective jobs, with each different prospective job having one or more different job parameters, wherein the different prospective jobs have not yet been created, receiving electronically a job order, the job order specifying a job with one or more job order parameters, matching the job order parameters for the job in the job order to one or more of indications of interest for a job by one or more workers to obtain an interest-job match if the job has not been secured to a worker with a commitment reservation, receiving a confirmation communication from the worker associated with the interest-job match, and securing electronically the job to the worker with the interest-job match.

Figure 2:
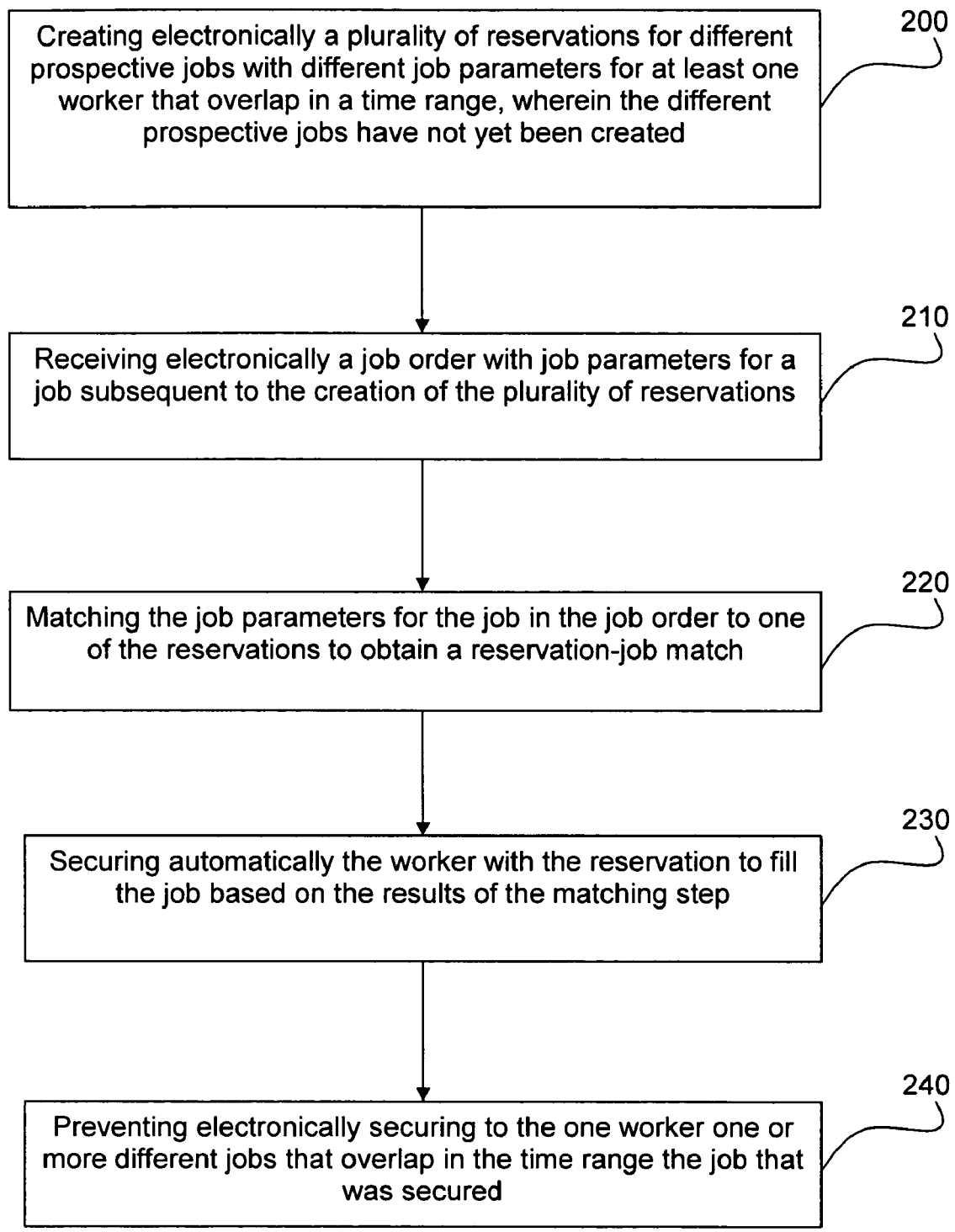
FIG. 2 is a block diagram of a flowchart for one embodiment of a method in accordance with the invention.

Referring to FIG. 2, a further embodiment is disclosed for filling job orders. In block 200 an operation is disclosed of creating electronically a plurality of uncommitted reservations for different prospective jobs with different job parameters for at least one worker that overlap in a time range, wherein the different prospective jobs have not yet been created.

In block 210 an operation is disclosed of receiving electronically in an email, posting, electronic file or other electronic communication, a job order with job parameters for a job subsequent to the creation of the plurality of reservations.

In block 220 an operation is disclosed of matching the job parameters for the job in the job order to one of the uncommitted reservations to obtain a uncommitted reservation-job match.

In block 230 an operation is disclosed of securing automatically, the worker with the uncommitted reservation to fill the job based on the results of the matching step.

In block 240 an operation is disclosed of preventing electronically securing to the one worker one or more different jobs that overlap in the time range with the job that was secured. As noted, the securing operation comprises associating the worker with the job. The securing operation may further comprise the operation of removing the job from one or more lists of available jobs created or to be updated for other workers and designating the job as filled.

In a further embodiment, an operation is provided of preventing electronically the securing of the job to one of the workers having a time range parameter that overlaps a time-off period for that one worker.

In a further embodiment, the operation is disclosed of securing electronically the job to one of the with a date and time range parameter only in a period designated as a willing to work period for that one worker.

Figure 3:
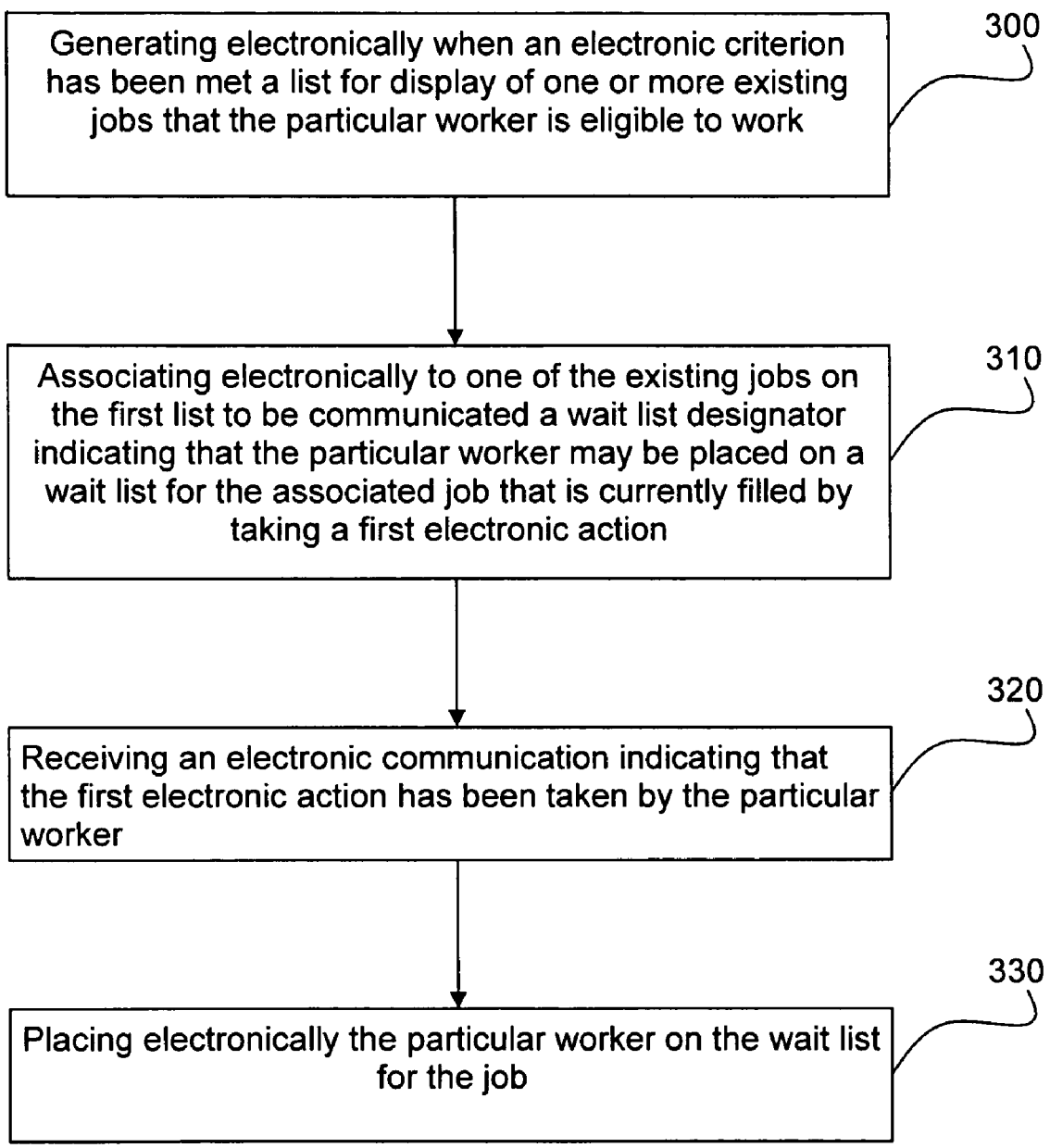
FIG. 3 is a block diagram of a flowchart for one embodiment of a method in accordance with the invention.

Referring to FIG. 3, a further embodiment of a method and programmed system for creating a wait list is disclosed. Block 300 discloses an operation of generating electronically in response to a criterion being met with respect to a first worker, a first list to be served of one or more existing jobs that the particular worker is qualified to work. For example, the criterion may be that the particular worker has connected to a server and logged onto his/her respective web page using an ID and password. Alternatively, the criterion may be that a search engine or computer search program set up by the particular worker has found a job that the worker is qualified to fill. Alternatively, the criterion may be that the worker is using an associated electronic appliance and is accessible electronically. A filtering operation would be used to perform an electronic comparison of the job parameters to the individual worker qualifications and to filter out jobs for which the individual worker is not qualified.

Block 310 discloses an operation of associating to one of the existing jobs on the first list to be electronically communicated a wait list designator indicating that the particular worker may be placed on a wait list for the associated job that is currently filled by taking a first electronic action.

Block 320 discloses an operation of receiving an electronic communication indicating that the first electronic action has been taken by the particular worker. Such an electronic communication might comprise receiving a response caused by a click of a button on the worker's web page, or receiving a communication initiated by keying and sending an entry from a cell phone or other electronic appliance.

Block 330 discloses an operation of placing electronically the particular worker on the wait list for the job. The wait list would typically be maintained in the fulfillment engine 20 or a data base associated therewith.

In a further embodiment, operations are provided associating to one of the jobs on the first list to be communicated electronically a designator, e.g., a hyperlink, indicating that one of the jobs has become open and may be accepted by the particular worker by taking a second electronic action such as clicking on the hyperlink, receiving an indication that the second electronic action has been taken by the particular worker to accept the job, and securing electronically the job for the particular worker as described above.

In a further embodiment, an operation is provided of preventing inclusion of a job on the first list to be communicated electronically if the worker has a previous commitment reservation with a time range parameter that overlaps a date and time range parameter for the job.

In a further embodiment, an operation is provided of preventing inclusion of a job on the first list to be communicated electronically if the worker has designated a time off period that overlaps a date and time range parameter for the job.

In a further embodiment, the generating a list step operates to prevent inclusion of a job order on the first list if a number of workers already on the wait list is equal to a predetermined number.

In a further embodiment, an operation is disclosed of providing information to be communicated electronically associated with one of the jobs on first list that is also on the wait list indicating how many workers are currently on the wait list for the job. Such information may comprise a number or some other means of indicating a current depth of one or more workers on the wait list. As noted, in one embodiment, the list may be served on a web page customized for the particular worker.

In a further embodiment, there are a plurality of workers on the wait list for a particular job, and further comprising the operations of receiving information that the particular job needs to be filled, selecting one of the workers on the wait list for the particular job based on at least one criterion, notifying the worker that the worker was selected for the particular job, and securing electronically the particular job for the worker.

In a further embodiment, operations are disclosed of receiving information that one or more electronic actions have been taken to place one of the workers on the wait list for a plurality of different jobs on the first list, but with at least one of the jobs being designated electronically as preferred, and generating electronically when the one worker connects to a server the first list to be served of one or more existing jobs that the particular worker is eligible to work, with the job designated as preferred differentiated in the first list to be served.

In a yet further embodiment, operations are disclosed of maintaining electronically a listing of an existing assignment of a job for a current worker, receiving electronically a time-off entry or an absence for the current worker, for example for illness or vacation, that overlaps for a period of time the existing assignment, creating automatically a vacancy to cover at least the overlap of the period of time for the existing assignment and the time-off entry or absence, receiving electronically a preference for a specific worker to fill the vacancy, communicating only with the specific worker about the vacancy if the vacancy has not been filled with a reservation commitment, and posting or otherwise communicating electronically the vacancy to one or more other workers only if no acceptance of the vacancy has been received from the specific worker within a predetermined period of time and only if the vacancy has not been filled with a reservation commitment. In one embodiment, the preference is received from the current worker.

Figure 4:
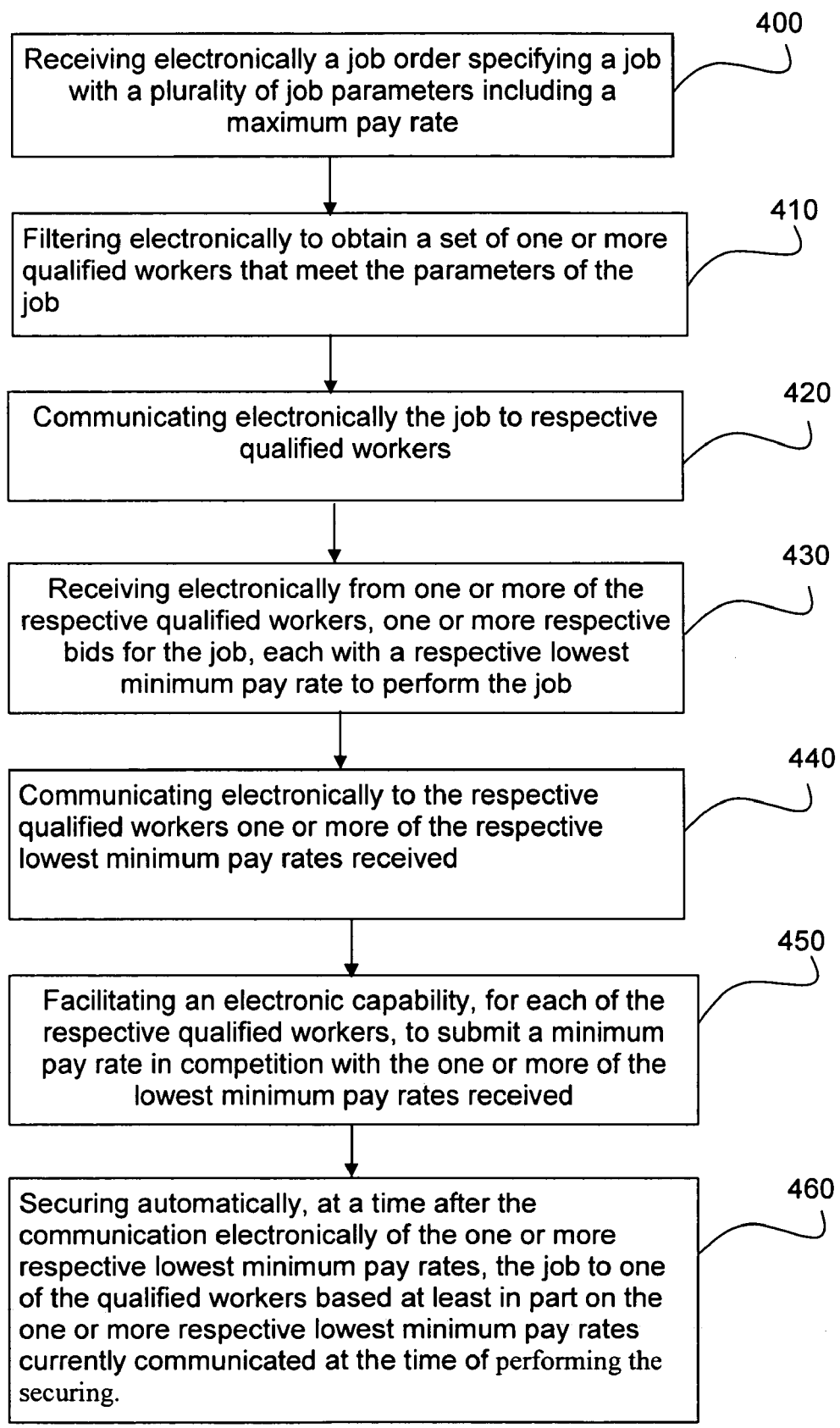
FIG. 4 is a block diagram of a flowchart for one embodiment of a method in accordance with the invention.

Referring to FIG. 4, in a further embodiment a method and system programming is disclosed for filling job orders. In block 400, an operation is disclosed of receiving electronically a job order specifying one or more jobs with a plurality of job parameters including a first pay rate.

In block 410 an operation is disclosed of performing a filtering operation to obtain a set of one or more qualified workers that meet the parameters of the job. The filtering operation may be performed by performing a comparison of the job parameters to worker qualifications, which may comprise job skills or availability during a given period or a given work site or some other qualification.

In block 420, an operation is disclosed of communicated electronically the job to one or more respective qualified workers. In one embodiment, the electronic communication may comprise posting the job on each of a plurality of qualified worker web pages for customized for the respective workers. Such web pages, in one embodiment, would display only jobs for which the worker was qualified. Alternatively, the electronic communication could comprise facilitating retrieval by a search engine or computer search program set up by the particular worker so that the job is communicated to the worker. The electronic method of communicating is not limiting on the invention.

In block 430, an operation is disclosed of receiving electronically from one or more of the respective qualified workers one or more respective bids for the job with a respective lowest minimum pay rate to perform the job. This minimum pay rate could simply comprise clicking acceptance of the job at the first pay rate.

In block 440, an operation is disclosed of communicating electronically one or more of the respective lowest minimum pay rates received to the respective qualified workers. In one embodiment, the electronic communication may comprise posting the one or more minimum pay rates on each of a plurality of respective qualified worker web pages or otherwise facilitating electronic communication to an electronic communication appliance of the one qualified workers.

In block 450, an operation is disclosed of facilitating electronically for the one or more of the respective qualified workers a capability to submit a minimum pay rate in competition with the one or more respective lowest minimum pay rates that have been communicated. In one embodiment, this operation may be accomplished by serving on the respective web page for each of the one or more of the respective qualified workers a capability to submit a minimum pay rate in competition with the one or more respective lowest minimum pay rates posted to the respective individual worker web pages.

In block 460, an operation is disclosed of securing automatically, at a time after the communicating of the one or more respective lowest minimum pay rates, the job to one of the qualified workers based at least in part on the one or more respective lowest minimum pay rates currently communicated at the time of performing the securing.

In one embodiment, after receiving bids from enough workers to fill all of the jobs in the job order, then serving one or more of the qualified workers subsequently accessing their respective web pages or communicating via their electronic appliance a second pay rate for performing the job that is less than the first pay rate.

In a further embodiment, a respective lowest minimum pay rate is received from a plurality of the qualified workers, and wherein the communicating electronically step comprises communicating a plurality of the respective minimum pay rates each coupled with a different characteristic, and wherein the securing comprises securing the job to one of the qualified workers based also on the respective different characteristic. In a further embodiment, the different characteristic comprises a skill level of the qualified worker.

In a further embodiment, the electrical communication of the job operation is only communicated to the individual qualified workers of workers having a reservation commitment recorded electronically for the job.

In a yet further embodiment, the operations are disclosed of calculating electronically a difference between the maximum pay rate for the job and the lowest minimum pay rate at which the job was secured, and apportioning electronically this difference between an entity that secures the job and a job provider or contractor.

In a yet further embodiment, operations are disclosed of communicating electronically the minimum pay rate received from another qualified worker that is lower that the communicated lowest minimum pay rate and designating that minimum pay rate as a new lowest minimum pay rate, providing electronically a capability for one or more of the qualified workers to submit a minimum pay rate that is lower that the communicated new lowest minimum pay rate, and securing automatically, at a time after the communication of the new lowest minimum pay rate, the job to one of the qualified workers that sent the current lowest minimum pay rate in the system at the time of performing the securing operation.

System Overview

Figure 5:
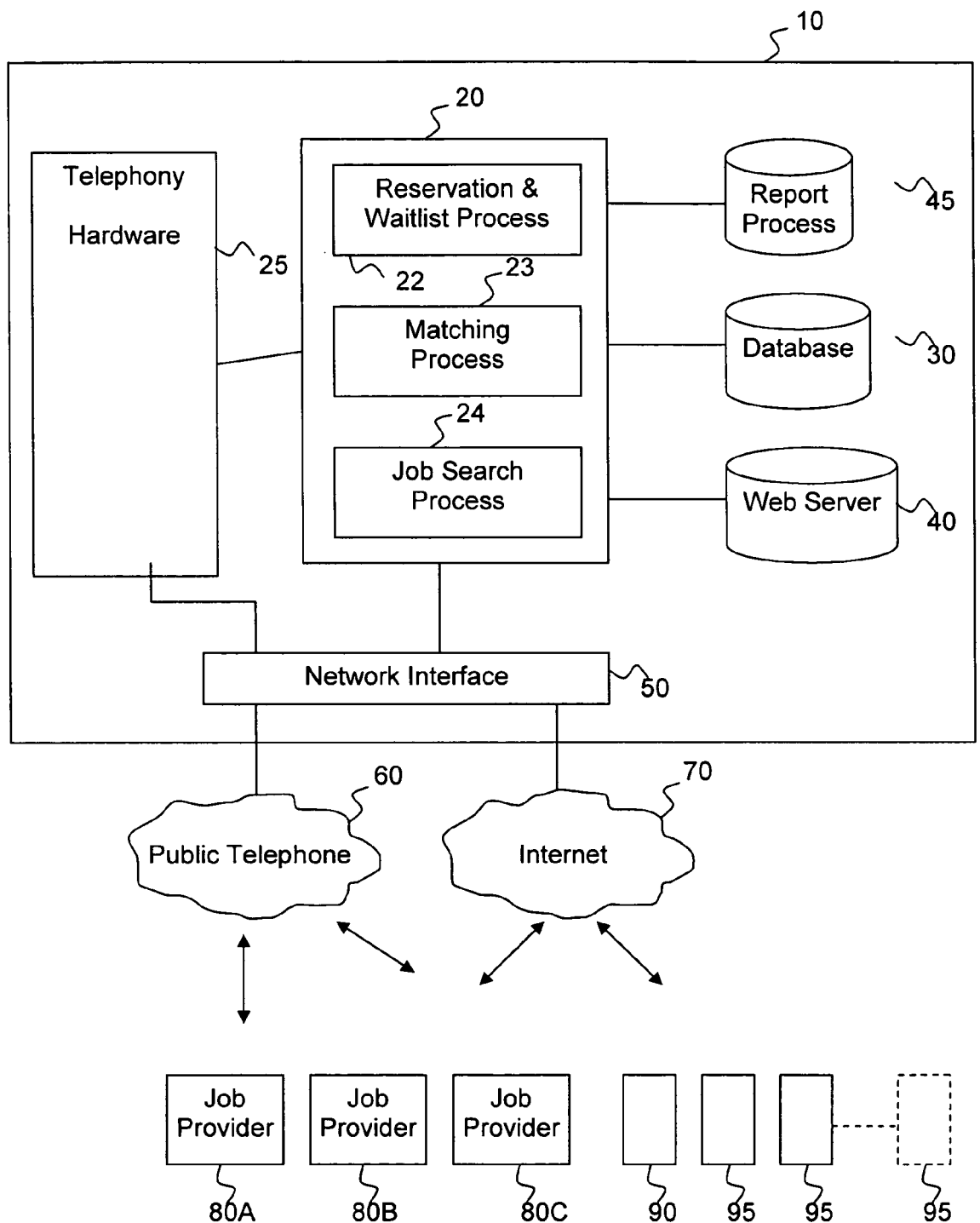
FIG. 5 is a schematic block diagram of an embodiment of the invention.

There is generally indicated at 10 in FIG. 5 a block diagram of a job fulfillment, information compilation and notification system in accordance with one embodiment of the invention. The components of system 10 comprise a communications and processing job fulfillment server 20, connected to a database engine 30, a web server 40, and a report processing unit 45. The server 20 includes therein a reservations and wait list processing engine 22 for processing reservations and the wait list, a matching process engine 23 for matching reservations parameters to job parameters, and a job search process engine 24 for matching worker qualifications to job qualification requirements. Each unit or server may run on a separate computer or on the same computer.

The system further comprises in one embodiment, telephony hardware 25 for communicating via a public or private telephone network 60. The system further comprises one or more network interfaces 50 for connecting to the various communication networks, such as the telephone network 60 and the Internet 70. The communications and processing job fulfillment server 20 manages the system 10, including managing communications interfaces and processing job fulfillment, and information compilation and notification events. The communications and processing server 20 also maintains the database 30, which contains data files with data records for multiple job provider organizations. The Web Server 40 manages and stores web pages accessible from the Internet. The Report Processing Unit 45 generates data for the reporting requirements of the system.

As noted, the communications and processing job fulfillment server 20 is connected to the Internet 70 via the network interface 50, which in one embodiment may comprise a router. In one embodiment, the communications and processing job fulfillment server 20 maintains at least two interfaces to outside communications networks, for example, two World Wide Web interfaces, for access to the job fulfillment system 10 via the Internet. The first such interface or web site may be principally directed towards job provider organizations 80A, 80B and 80C. The second such interface or web site may be principally directed toward current workers 90 and job seeker workers 95, and may provide a separate web page for each worker.

In one embodiment, the telephony hardware 25 may comprise interactive voice response technology (suitable equipment includes Dialogic™) that interfaces logically with callers, usually employing a set of pre-recorded prompts, a database, and dynamic selection criteria. The number called, and the caller identification are recorded in a data record. Example states for such a system may comprise, in one embodiment: an Identify state, where the potential replacement is prompted for an identification number, a PresentRequest state, where the request is played and the potential replacement is prompted for 1 to replay the request, 2 to accept and 3 to reject, a RejectRequest state, where the potential replacement is prompted for 1 to reject future requests, or 2 to allow additional requests to be phoned to the potential replacement, and an AcceptRequest state, where, if the potential replacement accepts the request, a confirmation number is played.

As noted above, a plurality of the operations of the invention are implemented on the communications and processing job fulfillment server 20, which can be, for example, a mainframe computer, minicomputer, workstation, personal computer, and/or a web computer. The computer on which one or more of the operations of the present invention may be implemented may comprise a special purpose computer or general-purpose computer programmed to perform the operations.

An example computer system upon which an embodiment of the invention may be implemented comprises a computer system, with a bus or other communication mechanism for communicating information, and a processor coupled with the bus for processing information. The computer system also includes a main memory, such as a random access memory (RAM) or other dynamic storage device, coupled to the bus for storing information and instructions to be executed by the processor. Main memory also may be used for storing temporary variables or other intermediate information during execution of instructions by processor. The computer system may further include a read only memory (ROM) or other static storage device coupled to the bus for storing static information and instructions for the processor. A storage device, such as a magnetic disk or optical disk, may also provided and coupled to bus for storing information and instructions.

The computer system may be coupled via the bus to a display, for displaying information to a computer user. An input device, including alphanumeric and other keys, is coupled to the bus for communicating information and command selections to the processor. Another type of user input device may comprises a cursor control for communicating direction information and command selections to the processor and for controlling cursor movement on the display.

One embodiment of the invention is related to the use of a computer system programmed to perform the processing as described. The processor in the system executes one or more sequences of one or more instructions loaded from main memory. Such instructions may also be obtained from another computer-readable medium, such as a storage device. Execution of the sequences of instructions cause the processor to perform the process steps described herein. One or more processors in a multi-processing arrangement may also be employed to execute the sequences of instructions. In alternative embodiments, hard-wired circuitry may be used in place of or in combination with the software instructions to implement the invention. Thus, embodiments of the invention are not limited to any specific combination of hardware circuitry and software.

Those skilled in the art will appreciate that the invention is to be practiced in network computing environments with many types of computer system configurations, including personal computers, hand-held devices, mobile telephones, multi-processor systems, microprocessor-based or programmable consumer electronics, network PCs, minicomputers, mainframe computers, to name a few. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

In a networked environment, the computer may operate using logical connections to one or more other computers having processors. Logical connections may include a local area network (LAN) and a wide area network (WAN) that are presented here by way of example and not limitation. Such networking environments are commonplace in office-wide or enterprise-wide computer networks, and intranets (a network belonging to an organization, usually a corporation, accessible only by the organization's members, workers, or others with authorization).

To facilitate communication, the network interface 50 may be designed to provide a two-way data communication coupling to a network link that may be connected to a local network. An example of such an interface comprises an integrated services digital network (ISDN) card or a modem to provide a data communication connection to a corresponding type of telephone line. As another example, the network interface 50 may be a local area network (LAN) card to provide a data communication connection to a compatible LAN. Wireless links may also be implemented. In any such implementation, the communication interface sends and receives electrical, electromagnetic or optical signals that carry digital data streams representing various types of information.

Accordingly, network interface 50 provides the capability for data communication through one or more networks to other data devices, such as job provider computers 80A-80C and worker computers 90 and 95. For example, the network interface 50 may provide a connection through the network to one or more host computers or to data equipment operated by an Internet Service Provider (ISP). The ISP, in turn, provides data communication services through the worldwide packet data communication network, now commonly referred to as the "Internet." The type of network link is not limiting on the invention. The communications and processing job fulfillment server 20 can send messages and receive data, including program code, through the network(s), network links, and the network interface 50.

Embodiments within the scope of the present invention also include computer-readable media for storing computer-executable instructions or data structures thereon. Such computer-readable media can be any available media, which can be accessed by a general purpose or special purpose computer. By way of example, and not limitation, such computer-readable media can comprise RAM, ROM, EPROM, EEPROM, CD-ROM or other optical disk storage, magnetic disk storage or other magnetic storage devices, or any other medium which can be used to store desired program code in the form of computer-executable instructions or data structures and which can be accessed by a general purpose or special purpose computer. Computer-executable instructions comprise, for example, instructions and data which configure a general purpose computer, special purpose computer, or special purpose processing device to perform a certain function or group of functions. Computer-executable instructions may also be properly termed "software" as known by those of skill in the art.

Program code or software means comprising one or more program modules may be stored on the hard disk, magnetic disk, optical disk, ROM or RAM, and may include an operating system, one or more application or software programs, other program modules, and program data. In some embodiments, the program(s) may be deployed and accessible on the Internet and operate within Web browsers.

Embodiments of the invention have been described in the general context of method steps which may be implemented in one embodiment by machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

Note that the operations described for the various embodiments of the invention may be combined in a variety of different ways. The invention encompasses any and all ways of combining these operations into a process.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or manual operations.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for filling job orders, comprising:

receiving or obtaining, using one or more computers, from each of a plurality of respective workers a request to make a commitment reservation, the commitment reservation comprising a commitment that is an obligation for the respective worker to work on a schedule specified by the respective worker on a prospective job not yet created, with the prospective job having one or more job parameters;

creating electronically, using the one or more computers, a respective commitment reservation for multiple of the respective workers based at least in part on the respective requests to make commitment reservations, each respective commitment reservation obligating the respective worker to work on a job created subsequent to the creation of the commitment reservation;

receiving or obtaining electronically, using the one or more computers, a job order subsequent to the creation of one of the commitment reservations, the job order specifying a job with one or more job parameters including a schedule for the job;

matching electronically, using the one or more computers, the job parameters including the schedule for the job in the job order to the job parameters including the schedules specified by the respective workers in one or more of the commitment reservations to obtain one or more reservation-job matches;

securing automatically, using the one or more computers, based at least in part on the results of the matching step and based at least in part on a priority algorithm the job in the job order to one of the workers with a commitment reservation.

2. The method as defined in claim 1, wherein the one or more predetermined parameters are selected from the group of position type, worksite, work shift, and date range and time range.

3. The method as defined in claim 1, further comprising:
receiving electronically data indicating that one of the workers did not work on the job secured for that worker; and
generating and sending electronically or making accessible electronically a report with the data that the worker did not work on the job secured for that worker.

4. The method as defined in claim 1, further comprising:
receiving electronically data indicating that one of the workers with a commitment reservation did not work on the job secured for that worker; and
preventing electronically, using the one or more computers, the creation of a commitment reservation for the one worker.

5. The method as defined in claim 1, wherein the commitment reservation can be made only by an administrator.

6. The method as defined in claim 1, wherein the commitment reservation can only be made after receiving an approval electronically from an administrator.

7. The method as defined in claim 1, further comprising preventing electronically, using the one or more computers, a number of commitment reservations for one of the jobs from exceeding a predetermined number.

8. The method as defined in claim 7, further comprising receiving electronically the predetermined number from or on behalf of a client business that is creating the jobs.

9. The method as defined in claim 1, further comprising preventing electronically, using the one or more computers, for one of the workers the creation of a commitment reservation with a time range parameter that overlaps with a time-off period for that one worker.

10. The method as defined in claim 1, further comprising preventing electronically, using the one or more computers, for one of the workers the creation of a commitment reservation with a time range parameter that overlaps a time range parameter for a commitment reservation for a different job previously created for that worker.

11. The method as defined in claim 1, wherein the priority algorithm is based at least in part on a worker characteristic.

12. The method as defined in claim 11, wherein the worker characteristic comprises one selected from the group of a worker with a commitment reservation having a fewest number of hours worked, and a worker with most seniority.

13. The method as defined in claim 1, further comprising:
creating automatically, using the one or more computers, a customized web page when one of the workers accesses a web site, the web page listing one or more commitment reservations associated with the worker accessing the web site; and facilitating display of available jobs that do not completely overlap a time range for one or more of the commitment reservations of the worker accessing the web site.

14. The method as defined in claim 1, further comprising determining that a number of commitment reservations for a job has exceeded a set number for that job; and
taking an electronic action, using the one or more computers, to prevent the making of further commitment reservations for that job.

15. The method as defined in claim 1, further comprising creating electronically, using the one or more computers, for one of the workers a commitment reservation with a date and time range parameter only in a period designated as a willing to work period for that one worker.

16. The method as defined in claim 1, further comprising:
creating electronically, using the one or more computers, a plurality of uncommitted reservations for different prospective jobs with different job parameters for at least one worker, which uncommitted reservations are capable of overlapping in a time range;
determining, using the one or more computers, if a job has not been assigned to any commitment reservations; and
assigning the job that has not been assigned to a commitment reservation to the worker with the uncommitted reservation.

17. The method as defined in claim 1, further comprising:
creating electronically, using the one or more computers, an indication of interest of a worker for one or more different prospective jobs, with each different prospective job having one or more different job parameters, wherein the different prospective jobs have not yet been created; and
obtaining electronically, using the one or more computers, a job order, the job order specifying a job with one or more job order parameters;
matching, using the one or more computers, the job order parameters for the job in the job order to one or more of indications of interest for a job by a worker to obtain an interest-job match if the job has not been secured to a worker with a commitment reservation;
receiving a confirmation communication from the worker associated with the interest-job match; and
securing, using the one or more computers, the job to the worker with the interest-job match.

18. The method as defined in claim 1, wherein the priority algorithm is selected from the group of first come first serve, random, and minimizing worker overtime.

19. A method for filling job orders, comprising:
receiving or obtaining, using one or more computers, from each of a plurality of respective workers a request to make an uncommitted reservation, the uncommitted reservation to work on a schedule specified by the respective worker on a prospective job not yet created, with the prospective job having one or more job parameters, wherein at least one of the workers has a plurality of requests that overlap;
creating electronically a plurality of uncommitted reservations for different prospective jobs with different job parameters, including a plurality of uncommitted reservations for the at least one worker with uncommitted reservations that overlap in a time range, wherein the different prospective jobs have not yet been created;
receiving or obtaining electronically a job order with job parameters including a schedule for a job subsequent to the creation of the plurality of reservations for the one worker;

matching electronically, using the one or more computers, the job parameters for the job including the schedule for the job in the job order to one or more uncommitted reservations to obtain one or more uncommitted reservation-job matches;

securing automatically, using the one or more computers, to the one worker with the uncommitted reservations that overlap to fill the job based at least in part on the results of the matching step and based at least in part on a priority algorithm; and preventing electronically, using the one or more computers, securing to the one worker with the uncommitted reservations that overlap one or more different jobs that overlap in the time range with the job that was secured.

20. The method as defined in claim 19, further comprising preventing electronically, using the one or more computers, the creation of an uncommitted reservation for one of the workers for one of the jobs having a time range parameter that overlaps a time-off period for that one worker.

21. The method as defined in claim 19, further comprising securing electronically, using the one or more computers, for one of the workers the job with a date and time range parameter only in a period designated as a willing to work period for that one worker.

22. The method as defined in claim 19, wherein a plurality of reservation-job matches are obtained, and comprising securing the job to a worker for one of the uncommitted reservation-job matches based on one or more preferences.

23. A system for filling job orders, comprising:
one or more computers programmed among them if more than one to perform the operations:
receiving or obtaining from each of a plurality of respective workers a request to make a commitment reservation, the commitment reservation comprising a commitment that is an obligation for the respective worker to work on a schedule specified by the respective worker on a prospective job not yet created, with the prospective job having one or more job parameters;
creating electronically a respective commitment reservation for multiple of the respective workers based at least in part on the respective requests to make commitment reservations, each respective commitment reservation obligating the respective worker to work on a job created subsequent to the creation of the commitment reservation;
receiving or obtaining electronically, using the one or more computers, a job order subsequent to the creation of one of the commitment reservations, the job order specifying a job with one or more job parameters including a schedule for the job;
matching, using the one or more computers, the job parameters including the schedule for the job in the job order to the job parameters including the schedules specified by the respective workers in one or more of the commitment reservations to obtain one or more reservation-job matches; and
securing automatically based at least in part on the results of the matching step and based at least in part on a priority algorithm the job in the job order to one of the workers with a commitment reservation.

24. The system as defined in claim 23, wherein the priority algorithm is selected from the group of first come first serve, random, and minimizing worker overtime.

25. A program product for filling job orders, comprising:
one or more computer readable storage media, comprising among them if more than one, program code for causing a computer, when executed, to perform the following steps:
receiving or obtaining, using one or more computers, from each of a plurality of respective workers a request to make a commitment reservation, the commitment reservation comprising a commitment that is an obligation for the respective worker to work on a schedule specified by the respective worker on a prospective job not yet created, with the prospective job having one or more job parameters;
creating electronically a respective commitment reservation, using the one or more computers, for multiple of the respective workers, based at least in part on the respective requests to make commitment reservations, each respective commitment reservation obligating the respective worker to work on a job created subsequent to the creation of the commitment reservation;
receiving or obtaining electronically, using the one or more computers, a job order subsequent to the creation of one of the commitment reservations, the job order specifying a job with one or more job parameters including a schedule for the job;
matching, using the one or more computers, the job parameters including the schedule for the job in the job order to the job parameters including the schedules specified by the respective workers in one or more of the commitment reservations to obtain one or more reservation-job matches;
securing automatically, using the one or more computers, based at least in part on the results of the matching step and based at least in part on a priority algorithm the job in the job order to one of the workers with a commitment reservation.

26. A system for filling job orders, comprising:
one or more computers programmed among them if more than one to perform the operations:
receiving or obtaining, using one or more computers, from each of a plurality of respective workers a request to make an uncommitted reservation, the uncommitted reservation to work on a schedule specified by the respective worker on a prospective job not yet created, with the prospective job having one or more job parameters, wherein at least one of the workers has a plurality of requests that overlap;
creating electronically a plurality of uncommitted reservations for different prospective jobs with different job parameters, including a plurality of uncommitted reservations for the at least one worker with uncommitted reservations that overlap in a time range, wherein the different prospective jobs have not yet been created;
receiving or obtaining electronically a job order with job parameters including a schedule for a job subsequent to the creation of the plurality of uncommitted reservations for the one worker;

matching, using the one or more computers, the job parameters including the schedule for the job in the job order to one or more uncommitted reservations to obtain one or more uncommitted reservation-job matches;

securing automatically, using the one or more computers, to the one worker with the uncommitted reservations that overlap to fill the job based at least in part on the results of the matching step and based at least in part on a priority algorithm; and preventing electronically, using the one or more computers, securing to the one worker with the uncommitted reservations that overlap one or more different jobs that overlap in the time range with the job that was secured.

* * * * *